(12) United States Patent
Kim et al.

(10) Patent No.: US 10,745,622 B2
(45) Date of Patent: Aug. 18, 2020

(54) ALIGNMENT LAYER COMPOSITION, LIQUID CRYSTAL DISPLAY INCLUDING THE ALIGNMENT LAYER COMPOSITION, AND MANUFACTURING METHOD OF THE LIQUID CRYSTAL DISPLAY

(71) Applicant: Samsung Display Co. Ltd., Yongin-si, Gyeonggi-do (KR)

(72) Inventors: Se Ran Kim, Suwon-si (KR); Suk Hoon Kang, Seoul (KR); Hoi Lim Kim, Seoul (KR); Young Mi Cho, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 215 days.

(21) Appl. No.: 15/878,873

(22) Filed: Jan. 24, 2018

(65) Prior Publication Data
US 2018/0148650 A1    May 31, 2018

Related U.S. Application Data

(62) Division of application No. 15/240,402, filed on Aug. 18, 2016, now Pat. No. 9,909,066.

(30) Foreign Application Priority Data

Apr. 21, 2016  (KR) .................. 10-2016-0048764
Jul. 29, 2016  (KR) .................. 10-2016-0097012

(51) Int. Cl.
*C09K 19/56*  (2006.01)
*C08G 73/10*  (2006.01)
(Continued)

(52) U.S. Cl.
CPC .......... *C09K 19/56* (2013.01); *C08G 73/1042* (2013.01); *C08G 73/1067* (2013.01);
(Continued)

(58) Field of Classification Search
CPC .... C09K 19/56; C08G 73/10; C08G 73/1067; C08G 73/105; C08G 73/1071;
(Continued)

(56) References Cited

U.S. PATENT DOCUMENTS 5,061,509 A   10/1991   Naito et al.
7,993,735 B1   8/2011   Pietrantoni et al.
(Continued)

FOREIGN PATENT DOCUMENTS

JP   201429465 A   2/2014
JP   2015135464 A   7/2015

OTHER PUBLICATIONS

G.M. Coppinger et al. "Photo-Fries Rearrangement of Aromatic Esters_ Role of Steric and Electronic Factors", vol. 70, No. 11, Nov. 1966, pp. 3479-3489.
(Continued)

*Primary Examiner* — Ruiyun Zhang
(74) *Attorney, Agent, or Firm* — Cantor Colburn LLP

(57) ABSTRACT

An alignment layer composition including a copolymer of a dianhydride compound and a diamine compound, wherein the copolymer includes a repeating unit represented by Formula 1:
(Continued)

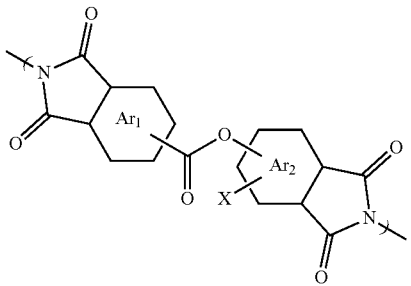

Formula 1 wherein each of Ar₁ and Ar₂ is independently a substituted or unsubstituted aromatic group comprising 6 to 30 carbon atoms, X is an electron donating group, and

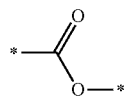

is an ester group, wherein "*" indicates a point of attachment to the aromatic groups Ar₁ and Ar₂.

16 Claims, 14 Drawing Sheets

(51) Int. Cl.
  $G02F\ 1/1337$ (2006.01)
  $C09K\ 19/34$ (2006.01)
  $C08G\ 73/16$ (2006.01)
  $C09D\ 179/08$ (2006.01)
(52) U.S. Cl.
  CPC ........... $C08G\ 73/16$ (2013.01); $C09D\ 179/08$ (2013.01); $C09K\ 19/34$ (2013.01); $G02F\ 1/133788$ (2013.01); $Y10T\ 428/10$ (2015.01); $Y10T\ 428/1005$ (2015.01); $Y10T\ 428/1023$ (2015.01)
(58) Field of Classification Search
  CPC ............. G02F 1/1337; G02F 1/133711; G02F 1/133723; G02F 1/13378; G02F 1/133788; Y10T 428/10; Y10T 428/1005; Y10T 428/1023
  USPC ........ 428/1.1, 1.2, 1.25, 1.26; 349/123, 126, 349/130, 132; 438/30; 528/339, 350, 528/353; 525/432; 522/164
  See application file for complete search history.

(56) References Cited

U.S. PATENT DOCUMENTS

2007/0026225 A1 2/2007 Chen et al.
2007/0232780 A1* 10/2007 Tamura ................ C08G 73/10
                                                    528/310
2011/0027589 A1 2/2011 Wu
2011/0223436 A1 9/2011 Wu et al.

OTHER PUBLICATIONS

Masaki Hasegawa et al. "Nematic Homogeneous Photo Alignment by Polyimide Exposure to Linearly Polarizied UV", Journal of Photopolymer Science and Technology vol. 8, No. 2 (1995) 241-248.
Non Final Office Action dated Jul. 19, 2017 issued for U.S. Appl. No. 15/240,402.
Son et al. "Microstructure and properties of polyamideimide/silica hybrids compatibilized with 3-aminopropyltriethoxysilane" European Polymer Journal 44, 2008, 2236-2243.
Yen et al. "Synthesis and properties of new polyimide-silica hybrid films through both intrachain and interchain bonding", Polymer 44, 2003, 7079-7087.

* cited by examiner

ALIGNMENT LAYER COMPOSITION, LIQUID CRYSTAL DISPLAY INCLUDING THE ALIGNMENT LAYER COMPOSITION, AND MANUFACTURING METHOD OF THE LIQUID CRYSTAL DISPLAY

This application is a divisional of U.S. patent application Ser. No. 15/240,402 filed on Aug. 18, 2016, which claims priority to Korean Patent Application No. 10-2016-0048764 filed on Apr. 21, 2016 and Korean Patent Application No. 10-2016-0097012 filed on Jul. 29, 2016, and all the benefits accruing therefrom under 35 U.S.C. § 119, the contents of all three applications are incorporated herein in their entirety by reference.

BACKGROUND

1. Field

The present disclosure relates to an alignment layer composition, a liquid crystal display (LCD) including the alignment layer composition, and a manufacturing method of the LCD.

2. Description of the Related Art

A liquid crystal display (LCD) device, which is one of the most widely-used display devices, includes two substrates on which field-generating electrodes such as pixel electrodes and a common electrode are formed and a liquid crystal layer which is interposed between the two substrates.

The LCD device generates an electric field by applying a voltage to the field-generating electrodes, and displays an image by determining the orientation of liquid crystal molecules in the liquid crystal layer and controlling the polarization of incident light.

To realize an image, the liquid crystal molecules in the liquid crystal layer need to be aligned in a particular direction at the interfaces with the field-generating electrodes. The uniformity of the alignment of the liquid crystal molecules is one of the most important factors that determine the display quality of the LCD. Accordingly, one or more alignment layers having anisotropy are formed between the liquid crystal layer and the field-generating electrodes so as to align the liquid crystal molecules in a particular direction.

As an exemplary method to form an alignment layer having anisotropy, anisotropy may be imparted to a polymer alignment layer by applying light to the polymer alignment layer. There still remains a need in superior manufacturing methods of the liquid crystal display devices having uniform alignment of liquid crystal molecules in the liquid crystal layer.

SUMMARY

Exemplary embodiments of the present disclosure provide an alignment layer composition including a novel photo-alignment polymer material.

Exemplary embodiments of the present disclosure also provide an alignment layer composition capable of improving the aligning property and contrast ratio of an alignment layer and reducing afterimage defects and a liquid crystal display (LCD) including the alignment layer composition.

Exemplary embodiments of the present disclosure also provide a manufacturing method of the LCD.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment, there is provided an alignment layer composition, including a copolymer of a dianhydride compound and a diamine compound, the copolymer including repeating units represented by Formula 1:

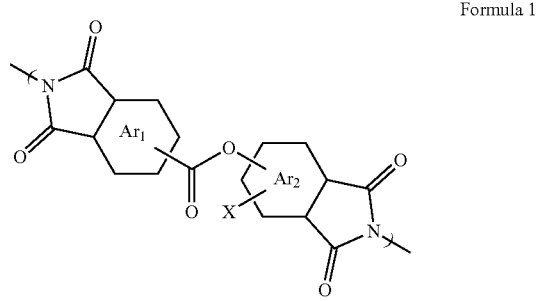

Formula 1 wherein
each of $Ar_1$ and $Ar_2$ is independently a substituted or unsubstituted aromatic group including 6 to 30 carbon atoms,
X is an electron donating group, and

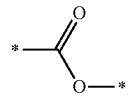

is an ester group, wherein "*" indicates a point of attachment to the aromatic groups $Ar_1$ and $Ar_2$.

In an exemplary embodiment, each of $Ar_1$ and $Ar_2$ may be independently a substituted or unsubstituted aromatic group including 6 carbon atoms.

In an exemplary embodiment, the Formula 1 may have a structure represented by Formula 1-1:

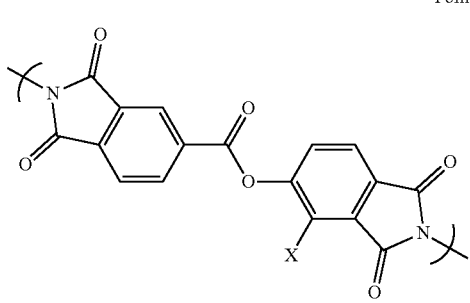

Formula 1-1 wherein X is an electron donating group.
In an exemplary embodiment,
the electron donating group X may be —$C_nH_{2n+1}$, —$OC_nH_{2n+1}$, —$NH_2$, —$NH(C_nH_{2n+1})$, —$N(C_nH_{2n+1})_2$, —OH, —$NH(COC_nH_{2n+1})$, —$N(COC_nH_{2n+1})_2$, —$OCOC_nH_{2n+1}$, —$CH_2(C_nH_{2n+1})$, —$CH(C_nH_{2n+1})_2$, —$C(C_nH_{2n+1})_3$, —F, —Cl, and —Br; and
n may be a natural number from 1 to 10.

In an exemplary embodiment, a C—O bond dissociation energy in the ester group of the repeating unit represented by Formula 1 may range from 2.563 electron volts to 3.019 electron volts.

In an exemplary embodiment, the Formula 1 may have a structure represented by one of Formulas 2 through 5:

Formula 2

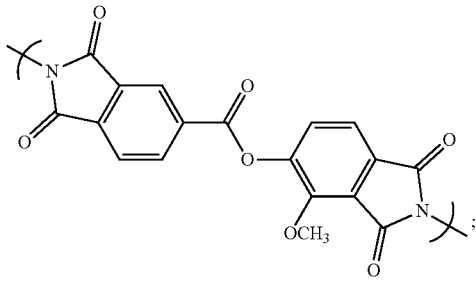

Formula 3

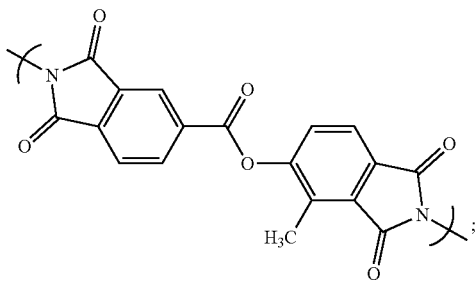

Formula 4

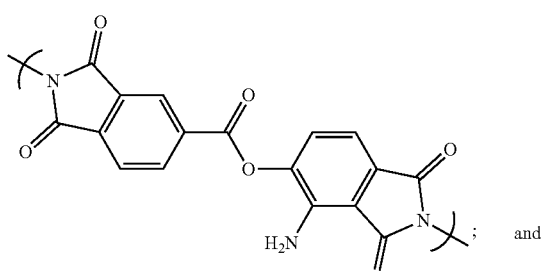

Formula 5

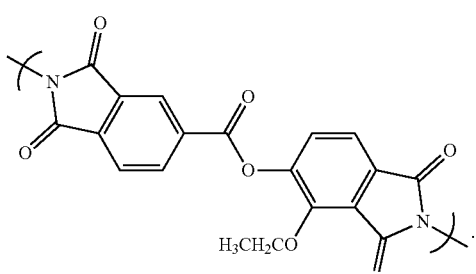

In an exemplary embodiment, the copolymer may further include a repeating unit represented by Formula 6:

Formula 6

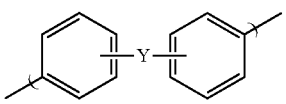

wherein Y is a divalent organic group derived from a diamine compound.

In an exemplary embodiment, the copolymer may include a repeating unit represented by Formula 7:

Formula 7

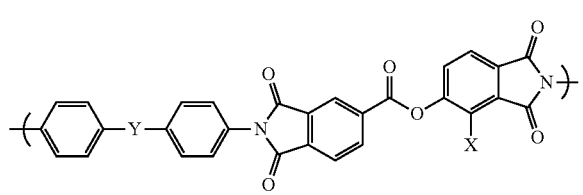

wherein
each of $Ar_1$ and $Ar_2$ is independently a substituted or unsubstituted aromatic group including 6 to 30 carbon atoms,
X is an electron donating group, and
Y is a divalent organic group derived from a diamine compound.

In an exemplary embodiment, the Formula 7 may have a structure represented by Formula 7-1:

Formula 7-1

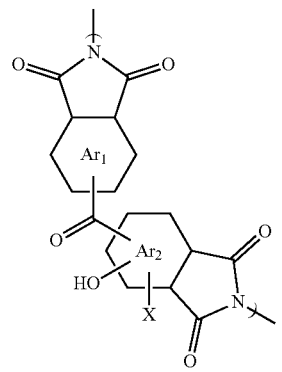

wherein
X is an electron donating group, and
Y is a divalent organic group derived from a diamine compound.

In an exemplary embodiment, the copolymer may further include a repeating unit represented by Formula 8:

Formula 8 wherein each of $Ar_1$ and $Ar_2$ is independently a substituted or unsubstituted aromatic group including 6 to 30 carbon atoms, and X is an electron donating group.

In an exemplary embodiment, the Formula 8 has a structure represented by Formula 8-1:

Formula 8-1

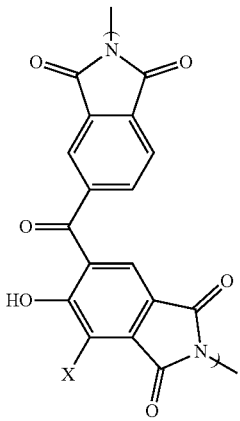

wherein X is an electron donating group.

In an exemplary embodiment, the mole ratio of the dianhydride compound and the diamine compound may be about 1:1.

According to an exemplary embodiment, there is provided a liquid crystal display, including:

first and second substrates facing each other;

a first alignment layer disposed on a surface of the first substrate that faces the second substrate;

a second alignment layer disposed on a surface of the second substrate that faces the first substrate; and a liquid crystal layer interposed between the first substrate and second substrate, wherein at least one of the first alignment layer and the second alignment layer includes a copolymer of a dianhydride compound and a diamine compound, and wherein the copolymer includes a repeating unit represented by Formula 1:

Formula 1

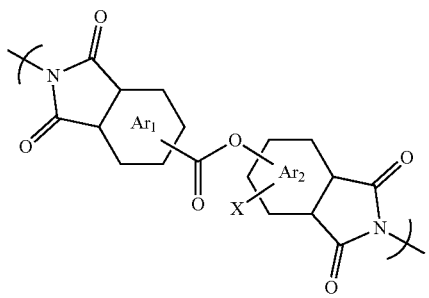

each of $Ar_1$ and $Ar_2$ is independently a substituted or unsubstituted aromatic group including 6 to 30 carbon atoms, wherein X is an electron donating group, and

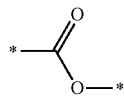

is an ester group, wherein "*" indicates a point of attachment to the aromatic groups $Ar_1$ and $Ar_2$.

In an exemplary embodiment, the copolymer may further include a repeating unit represented by Formula 6:

Formula 6

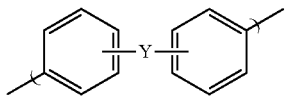

wherein Y is a divalent organic group derived from a diamine compound.

In an exemplary embodiment, the copolymer may include a repeating unit represented by Formula 7:

Formula 7

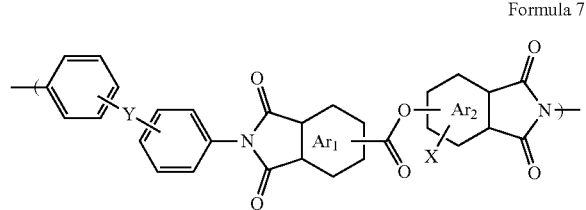

wherein each of $Ar_1$ and $Ar_2$ is independently a substituted or unsubstituted aromatic group including 6 to 30 carbon atoms, X is an electron donating group, and Y is a divalent organic group derived from a diamine compound.

In an exemplary embodiment, the copolymer may further include a repeating unit represented by Formula 8:

Formula 8

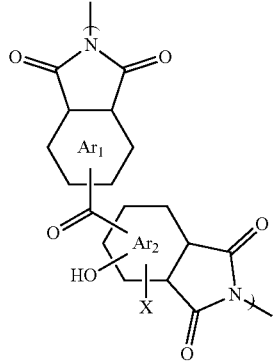

wherein each of $Ar_1$ and $Ar_2$ is independently a substituted or unsubstituted aromatic group including 6 to 30 carbon atoms, and X is an electron donating group.

In an exemplary embodiment, the copolymer may further include a repeating unit represented by Formula 9:

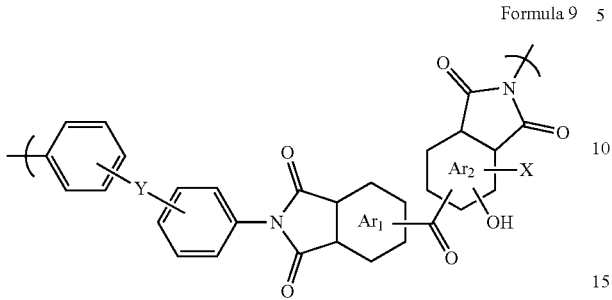

Formula 9 wherein each of $Ar_1$ and $Ar_2$ is independently a substituted or unsubstituted aromatic group including 6 to 30 carbon atoms, X is an electron donating group, and Y is a divalent organic group derived from a diamine compound.

According to an exemplary embodiment, there is provided a manufacturing method of an LCD, including:

providing a substrate;

disposing an alignment layer composition onto the substrate;

applying linearly polarized light to the alignment layer composition; and performing thermal treatment on the alignment layer composition, wherein the alignment layer composition includes a copolymer of a dianhydride compound and a diamine compound, and wherein the copolymer includes a repeating unit represented by Formula 1:

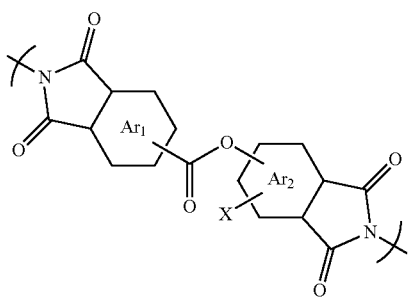

Formula 1 wherein each of $Ar_1$ and $Ar_2$ is independently a substituted or unsubstituted aromatic group including 6 to 30 carbon atoms, X is an electron donating group, and

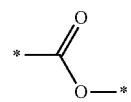

is an ester group, wherein "*" indicates a point of attachment to the aromatic groups $Ar_1$ and $Ar_2$.

In an exemplary embodiment, the applying the linearly polarized light may transform at least one repeating unit represented by Formula 1 into a repeating unit represented by Formula 8:

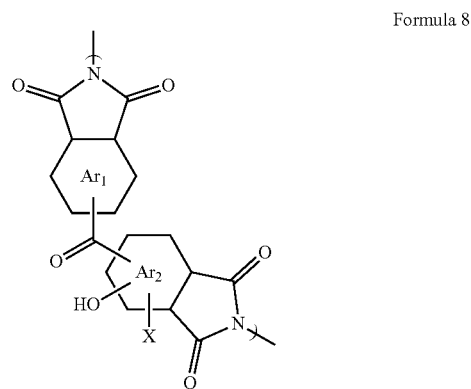

Formula 8 wherein each of $Ar_1$ and $Ar_2$ is independently a substituted or unsubstituted aromatic group including 6 to 30 carbon atoms, and X is an electron donating group.

In an exemplary embodiment, the at least one repeating unit represented by Formula 1 in a polarization direction of the linearly polarized light may be transformed into the repeating unit represented by Formula 8.

In an exemplary embodiment, the copolymer may include a repeating unit represented by Formula 7:

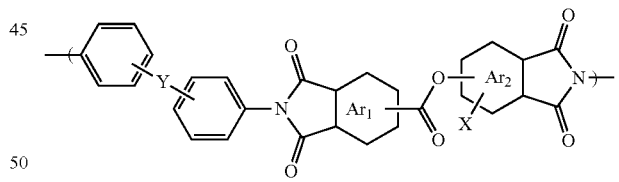

Formula 7 wherein each of $Ar_1$ and $Ar_2$ is independently a substituted or unsubstituted aromatic group including 6 to 30 carbon atoms, X is an electron donating group, and Y is a divalent organic group derived from a diamine compound.

In an exemplary embodiment, the applying the linearly polarized light may transform at least one repeating unit represented by Formula 7 into a repeating unit represented by Formula 9:

Formula 9

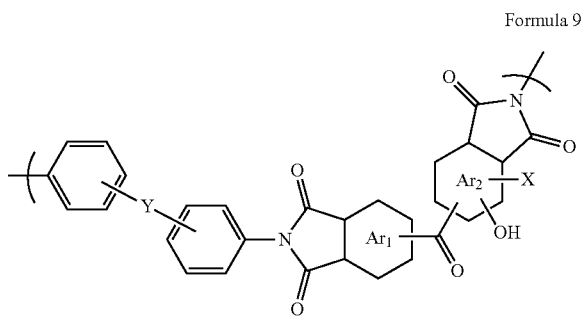

wherein each of $Ar_1$ and $Ar_2$ is independently a substituted or unsubstituted aromatic group including 6 to 30 carbon atoms, X is an electron donating group, and Y is a divalent organic group derived from a diamine compound.

In an exemplary embodiment, the at least one repeating unit represented by Formula 7 in a polarization direction of the linearly polarized light may be transformed into the repeating unit represented by Formula 9.

In an exemplary embodiment, the performing thermal treatment may be carried out at a temperature of about 210° C. to 240° C. for about 20 to 45 minutes.

In an exemplary embodiment, the method may further include, before the applying the linearly polarized light:

performing pretreatment on the alignment layer composition at a temperature of about 60° C. to 80° C. for about 50 to 100 seconds.

Other features and aspects will be apparent from the following detailed description, the drawings, and the claims.

According to the exemplary embodiments of the present disclosure, a photo-alignment layer with anisotropy imparted thereto by a novel photoreaction may be provided.

In addition, the aligning property and contrast ratio of an alignment layer may be improved, and afterimage defects may be reduced.

Moreover, a liquid crystal display including an alignment composition capable of providing the aforementioned advantages and a manufacturing method of the liquid crystal display may be provided.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
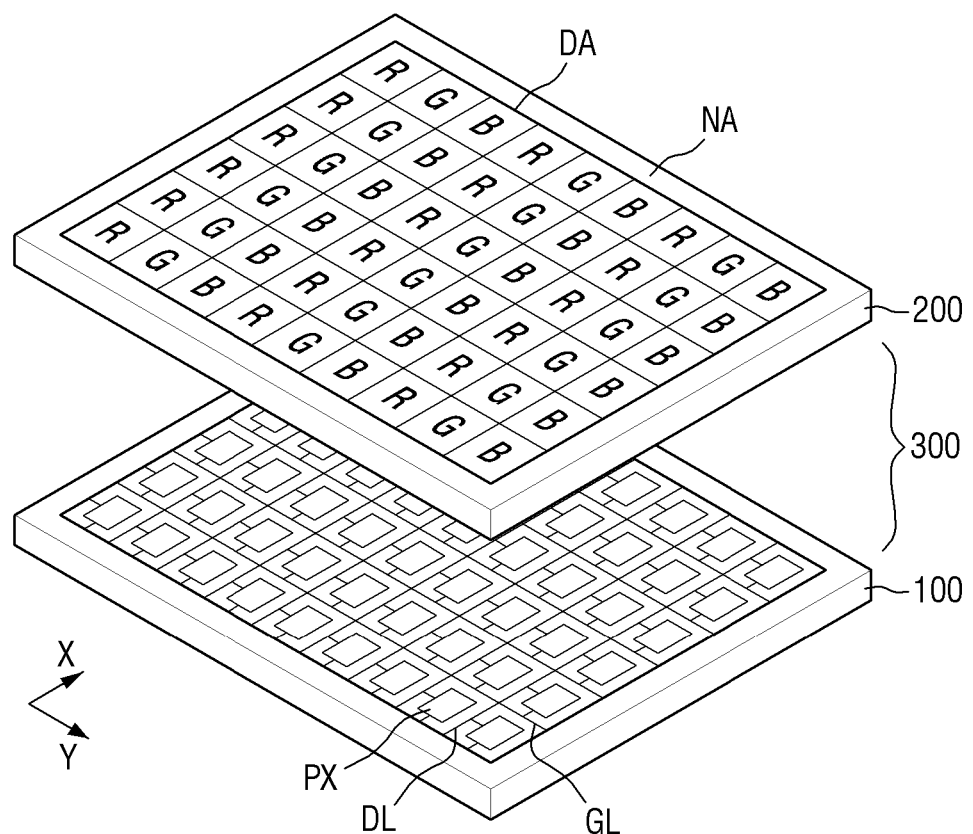
FIG. 1 is a schematic exploded perspective view of a liquid crystal display (LCD) according to an exemplary embodiment of the present disclosure.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the present disclosure will hereinafter be described with reference to the accompanying drawings.

FIG. 1 is a schematic exploded perspective view of a liquid crystal display (LCD) according to an exemplary embodiment of the present disclosure.

Referring to FIG. 1, the LCD according to the present exemplary embodiment includes a first substrate 100, a first alignment layer (not illustrated), which is disposed on the first substrate 100, a second substrate 200, which is spaced apart from, and faces, the first substrate 100, a second alignment layer (not illustrated), which is disposed on the second substrate 200, and a liquid crystal layer 300, which is interposed between the first and second substrates 100 and 200. The first substrate 100 may be a lower display substrate, and the second substrate 200 may be an upper display substrate.

Each of the first and second substrates 100 and 200 includes a display area DA and a non-display area NA. The display area DA is an area in which an image is viewed, and the non-display area NA is an area in which no image is viewed. The circumference of the display area DA is surrounded by the non-display area NA.

The display area DA includes a plurality of data lines DL, which extend in a first direction X, for example, a column direction, a plurality of gate lines GL, which extend in a second direction Y intersecting the first direction X, for example, a row direction, and a plurality of pixels PX, which are formed at the intersections between the gate lines GL and the data lines DL. The pixels PX may be arranged along the first and second directions X and Y, substantially in a matrix form.

Each of the pixels PX may uniquely display one of a number of primary colors to realize a color display. Examples of the primary colors include red, green, and blue.

The non-display area NA may be a light-shielding area. In the non-display area NA of the first substrate 100, drivers (not illustrated), which provide gate driving signals and data driving signals to the pixels PX in the display area DA, may be provided. The gate lines GL and the data lines DL may extend from the display area DA to the non-display area NA and may be electrically connected to the drivers.

The liquid crystal layer 300 may be interposed between the first and second substrates 100 and 200. The liquid crystal layer 300 may include liquid crystal molecules LC, which have positive dielectric anisotropy, but the present disclosure is not limited thereto. That is, alternatively, the liquid crystal layer 300 may include liquid crystal molecules having negative dielectric anisotropy.

The elements of the LCD according to the present exemplary embodiment will hereinafter be described in further detail.

Figure 2:
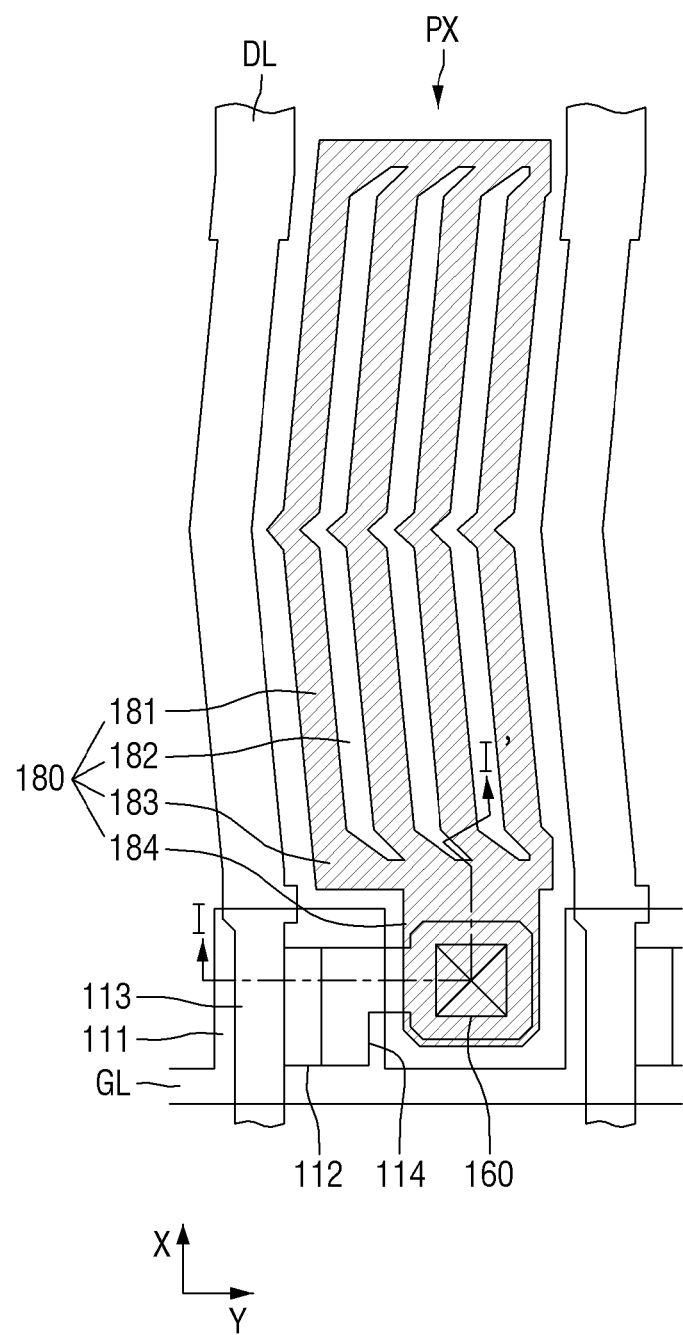
FIG. 2 is a schematic plan view of a pixel of the LCD of FIG. 1.
Figure 3:
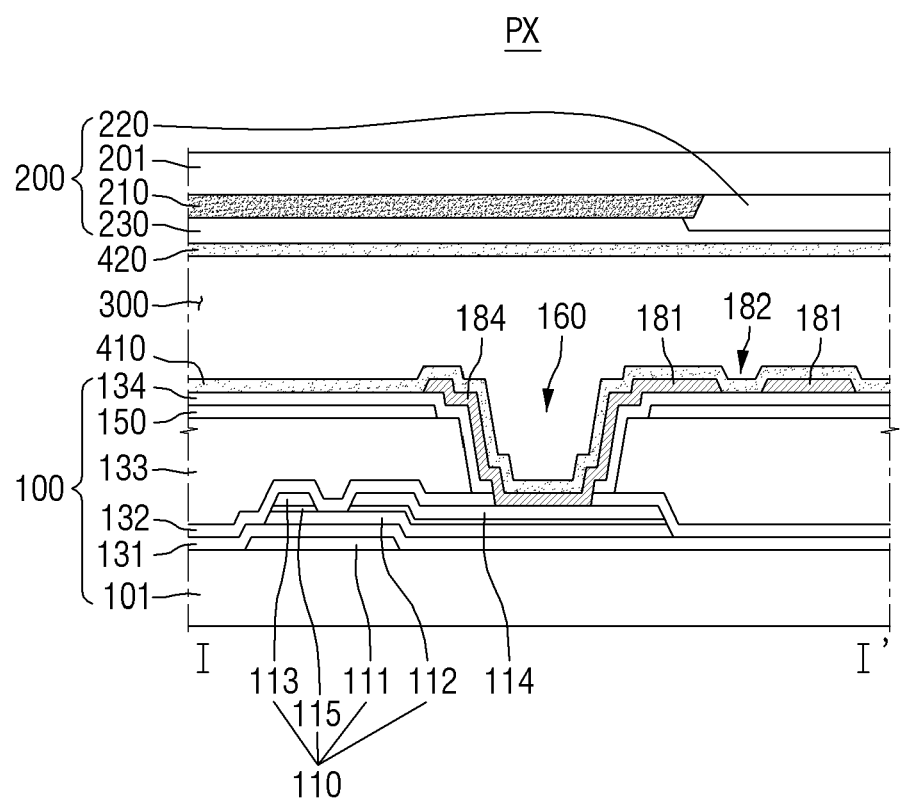
FIG. 3 is a schematic cross-sectional view taken along line I-I' of FIG. 2.

FIG. 2 is a schematic plan view of a pixel of the LCD of FIG. 1, and FIG. 3 is a schematic cross-sectional line taken along line I-I' of FIG. 2.

Referring to FIGS. 2 and 3, the first substrate 100 may include a first base substrate 101, at least one thin-film transistor (TFT) 110, a common electrode 150, a pixel electrode 180, and a plurality of passivation/insulating layers.

A gate wiring layer may be disposed on the first base substrate 101. The gate wiring layer may include a gate line GL and a gate electrode 111.

The gate line GL may extend substantially in the second direction Y. The gate electrode 111 may protrude upwardly from the gate line GL and may be formed in one body with the gate line GL with no physical boundary therebetween. A gate signal provided from the gate line GL may be applied to the gate electrode 111.

A first insulating layer 131 may be disposed on the gate wiring layer over the entire surface of the first base substrate 101. The first insulating layer 131 may be formed of an insulating material and may electrically insulate layers formed thereon from layers formed therebelow. The first insulating layer 131 may have a multilayer structure including at least two insulating layers having different physical properties.

A semiconductor layer 112 is disposed on the first insulating layer 131. At least part of the semiconductor layer 112 is disposed in an area of overlap with the gate electrode 111. The semiconductor layer 112 serves as a channel of the TFT 110 and may turn on or off the channel according to the voltage applied to the gate electrode 111.

A data wiring layer may be disposed on the semiconductor layer 112. The data wiring layer may include a data line DL, a source electrode 113, and a drain electrode 114.

The data line DL extends substantially in the second direction X2 and may intersect the gate line GL. A data signal may be applied to the data line DL. An area where the data line DL and the gate line GL intersect each other may be defined as a pixel area corresponding to a pixel PX.

The source electrode 113 and the drain electrode 114 may be disposed over the gate electrode 111 and the semiconductor layer 112 and may be spaced apart from each other. The source electrode 113 may be formed in one body with the data line DL with no physical boundary therebetween. FIGS. 2 and 3 illustrate an example in which the source electrode 113 is formed as a part of the data line DL, but in another example, the source electrode 113 may protrude from the data line DL toward the gate electrode 111. The drain electrode 114 may be electrically connected to the pixel electrode 180 via a contact hole 160 that will be described later.

An ohmic contact layer 115 may be disposed between the semiconductor layer 112 and the data wiring layer. The ohmic contact layer 115 may include an n+ hydrogenated amorphous silicon material doped with a high concentration of n-type impurities, or silicide.

A passivation layer 132 may be disposed on the data wiring layer over the entire surface of the first base substrate 101. The passivation layer 132 may be formed as an inorganic layer and may have a single- or multilayer structure. The passivation layer 132 may prevent the underlying wires and electrodes from being exposed to directly contact an organic material. A planarization layer 133 is disposed on the passivation layer 132 over the entire surface of the first base substrate 101. The planarization layer 133 may include an organic material. The planarization layer 133 may make the heights of a plurality of elements stacked on the first base substrate 101 uniform.

The common electrode 150 is disposed on the planarization layer 133. The common electrode 150 may be a transparent electrode. A common voltage is applied to the common electrode 150, and the common electrode 150 controls the alignment direction of the liquid crystal molecules LC in the liquid crystal layer 300 by forming an electric field together with the pixel electrode 180 to which a data voltage is applied. A second insulating layer 134 is disposed on the common electrode 150 and may insulate the common electrode 150 therebelow from the pixel electrode 180 thereabove.

The contact hole 160 may be formed in the passivation layer 132, the planarization layer 133, and the second insulating layer 134. The drain electrode 114 may be electrically connected to the pixel electrode 180 via the contact hole 160.

The pixel electrode 180 may be disposed, in the pixel area, on the second insulating layer 134 and on part of the drain electrode 114 exposed by the contact hole 160. The pixel electrode 180, like the common electrode 150, may be a transparent electrode.

The pixel electrode 180 may be a patterned electrode including a plurality of branch electrodes 181, a plurality of slits 182, which are formed among the branch electrodes 181, a connecting electrode 183, which is disposed on at least one side of the branch electrodes 181, and which connects the branch electrodes 181, and a protruding electrode 184, which protrudes from the connecting electrode 183 toward the contact hole 160.

The branch electrodes 181 and the slits 182 may be formed as bars that are bent to be substantially symmetrical with respect to the center of the pixel area, and at least two domains may be formed in the pixel area. The arrangement of the long axes of the liquid crystal molecules LC may differ from one domain to another domain, and thus, a color shift phenomenon may be suppressed at a particular azimuth angle. The protruding electrode 184 may be electrically connected to the drain electrode 114 via the contact hole 160 and may thus receive a data voltage. The connecting electrode 183 connects the protruding electrode 184 and the branch electrodes 181, and may thus provide the data voltage from the protruding electrode 184 uniformly to each of the branch electrodes 181.

A first alignment layer 410 may be disposed on the first substrate 100. The first alignment layer 410 may be a horizontal alignment layer. The first alignment layer 410 may have anisotropy and may align the liquid crystal molecules LC in the liquid crystal layer 300 so as for the long axes of the liquid crystal molecules LC to be oriented in a particular direction on a plane. The first alignment layer 410 may be a photo-alignment layer including a photo-functional group capable of inducing a photoreaction. The first alignment layer 410 will be described later in further detail together with a second alignment layer 420.

The second substrate 200 will hereinafter be described. The second substrate 200 may include a second base substrate 201, a light-shielding member 210, a color filter 220, and an overcoat layer 230.

The second base substrate 201, like the first base substrate 101, may be a transparent insulating substrate. The light-shielding member 210 is disposed on the second base substrate 201. The light-shielding member 210 may be, for example, a black matrix. The light-shielding member 210 may be disposed along the boundary between the pixel area and a neighboring pixel area, i.e., in areas of overlap with the data line DL, the gate line GL, and the TFT 110. That is, the light-shielding member 210 may be disposed along the boundary between the pixel area and the neighboring pixel area at which the transmission of light incident from a backlight unit (not illustrated) below the first substrate 100 actually takes place, and may thus prevent unintended color mixing and light leakage defects.

The color filter 220 may be disposed on the light-shielding member 210 in an area of overlap with the pixel area. The color filter 220 may selectively transmit light of a particular wavelength range therethrough. The color filter 220 may be disposed between the data line DL and a neighboring data line DL and may account for most of the pixel area. Color filters having different colors and transmitting light of different colors therethrough may be disposed in adjacent pixel areas, respectively, or no color filters may be provided. FIGS. 2 and 3 illustrate a color filter on array structure in which the color filter 220 is disposed on the TNT 110, but alternatively, the color filter 220 may be disposed below the TFT 110 or may be provided in the first substrate 100.

The overcoat layer 230 is disposed on the light-shielding member 210 and the color filter 220 over the entire surface of the second base substrate 201. The overcoat layer 230 may be an organic layer formed of an organic material. The overcoat layer 230 may prevent the light-shielding member 210 and the color filter 220 from being detached and misplaced from the second base substrate 201, and may make the heights of a plurality of elements stacked on the second base substrate 201 uniform. Also, the overcoat layer 230 may suppress the liquid crystal layer 300 from being polluted by a compound such as a solvent from the color filter 220, and may thus prevent defects such as afterimages that may occur during screen driving.

The second alignment layer 420 may be disposed on the second substrate 200. The second alignment layer 420, like the first alignment layer 410, may be a horizontal alignment layer. The first and second alignment layers 410 and 420 will hereinafter be described.

The first alignment layer 410 and/or the second alignment layer 420 may be formed of an alignment layer composition according to an exemplary embodiment of the present disclosure.

The alignment layer composition may be a copolymer of a dianhydride compound and a diamine compound, particularly, a copolymer including a polyamic acid having a photoreactive group in its repeating units, a polymer obtained by partially imidization of a polyamic acid having a photoreactive group in its repeating units, a polyimide obtained by dehydrocyclization of a polyamic acid having a photoreactive group in its repeating units, or a combination thereof.

For example, the alignment layer composition may include, in its repeating units, a photoreactive group including a phenyl ester group, and the photoreactive group may be derived from a dianhydride compound.

The repeating units of the alignment layer composition that include a phenyl ester group, i.e., a photoreactive group, may have a structure represented by Formula 1:

Formula 1

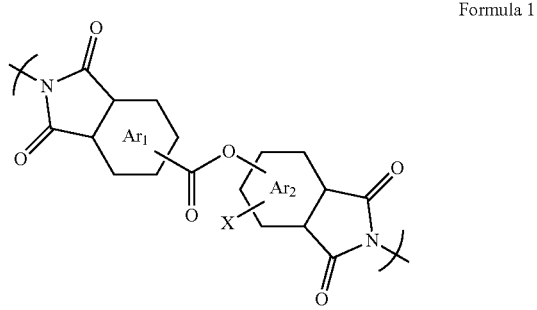

wherein each of $Ar_1$ and $Ar_2$ is independently a substituted or unsubstituted aromatic group including 6 to 30 carbon atoms,

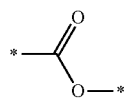

is an ester group, wherein "*" indicates a point of attachment to the aromatic groups $Ar_1$ and $Ar_2$, X is an electron donating group (EDG) and may be —$C_nH_{2n+1}$, —$OC_nH_{2n+1}$, —$NH_2$, —$NH(C_nH_{2n+1})$, —$N(C_nH_{2n+1})_2$, —OH, —$NH(COC_nH_{2n+1})$, $N(COC_nH_{2n+1})_2$, —$OCOC_nH_{2n+1}$, —$CH_2(C_nH_{2n+1})$, —CH$(C_nH_{2n+1})_2$, —$C(C_nH_{2n+1})_3$, —F, —Cl, or —Br, and n may be a natural number from 1 to 10.

In an embodiment, each of $Ar_1$ and $Ar_2$ may be independently a substituted or unsubstituted aromatic group including 6 carbon atoms.

In another embodiment, the Formula 1 may have a structure represented by Formula 1-1:

Formula 1-1

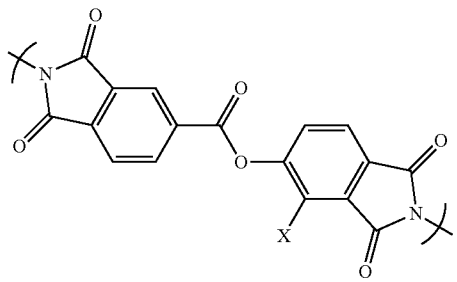

wherein X is an electron donating group.

Figure 4:
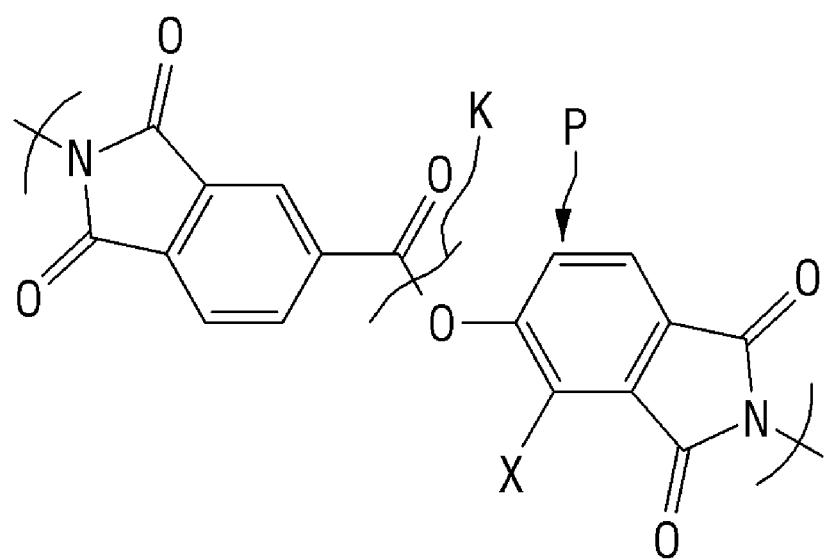
FIG. 4 shows Formula 1-1.

The term "EDG" denotes a substituent with an abundance of electrons, and the substituent X tends to donate electrons to the opposite side thereof. Referring to FIG. 4, a "C—O" bond (K) in the O=C—O group in the phenyl ester group of Formula 1-1 may be cleaved to become a monovalent cation, and may then be recombined to a portion P with a high retention of electrons.

For example, the repeating group represented by Formula 1 may be transformed into a repeating group represented by Formula 8 below by a Fries photoreaction. That is, the alignment layer composition according to an exemplary embodiment has one of the sites thereof where recombination takes place in a Fries photoreaction substituted with an EDG and may thus generate rearranged repeating units of only one type, as shown in Formula 8:

Formula 8

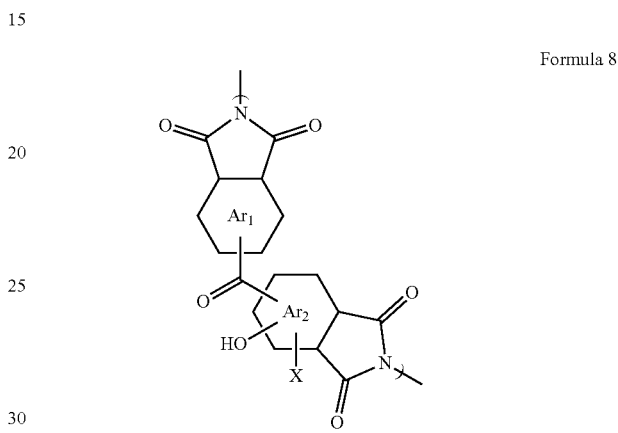

wherein $Ar_1$, $Ar_2$, X, and Y are the same as X of Formula 1.

In an embodiment, the Formula 8 has a structure represented by Formula 8-1:

Formula 8-1

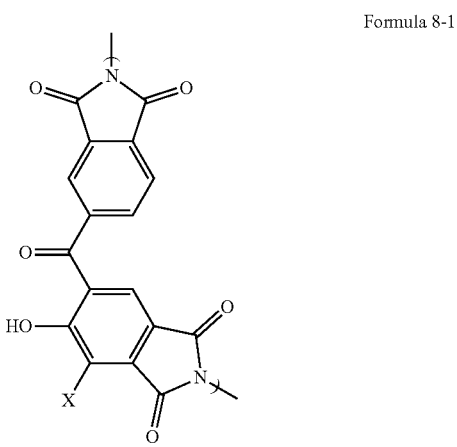

wherein X is an electron donating group.

Referring again to FIG. 4, the bond dissociation energy (BDE) of the C—O bond (K) of the O=C—O group in the phenyl ester group of Formula 1-1 may be in the range of 2.563 electron volts (eV) to 3.019 eV. In this BDE range, an excellent alignment force and an excellent contrast ratio may be provided, which will be described later in detail with experimental data.

The repeating units represented by Formula 1-1 may have, but is not limited to, a structure represented by any one of Formulas 2 through 5:

Formula 2

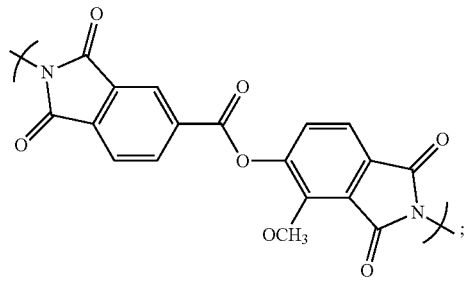

Formula 3

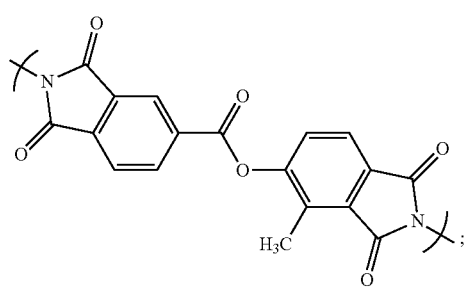

Formula 4

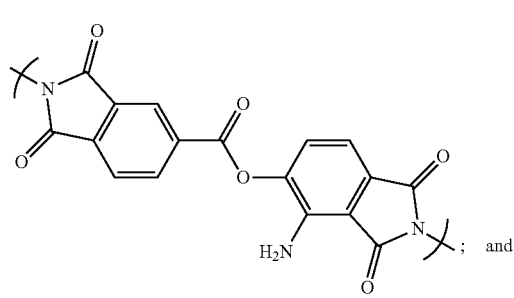

and

Formula 5

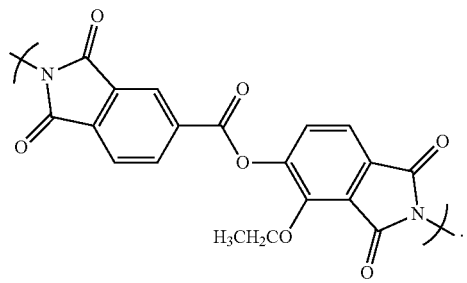

The copolymer of the alignment layer composition according to an exemplary embodiment may include a repeating unit represented by Formula 6:

Formula 6

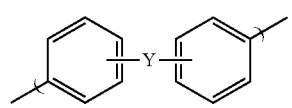

wherein Y is a divalent organic group derived from a diamine compound.

In an embodiment, the Formula 6 may have a structure represented by Formula 6-1:

Formula 6-1

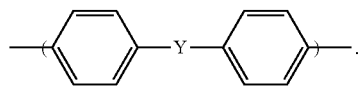

The ratio of the repeating units represented by Formula 6 and the repeating units represented by Formula 1 may be about 1:1. For example, the repeating units represented by Formula 1 may be derived from a dianhydride compound, the repeating units represented by Formula 6 may be derived from a diamine compound, and the mole ratio of the dianhydride compound and the diamine compound may be about 1:1.

For example, the copolymer of the alignment layer composition may be represented by Formula 7:

Formula 7

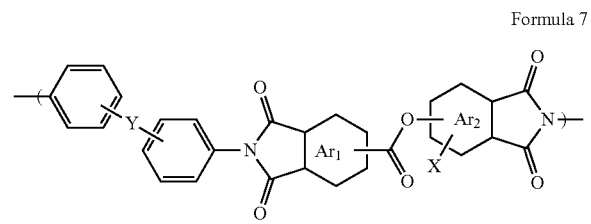

wherein $Ar_1$, $Ar_2$, and X are the same as $Ar_1$, $Ar_2$, and X of Formula 1, and Y is the same as Y of Formula 6.

The LCD according to the present exemplary embodiment includes one or more alignment layers formed using the aforementioned alignment layer composition according to an exemplary embodiment of the present disclosure.

The LCD according to the present exemplary embodiment includes the first and second substrates 100 and 200, the first and second alignment layers 410 and 420, which are disposed on opposite surfaces, respectively, of the first and second substrates 100 and 200, and the liquid crystal layer 300, which is interposed between the first and second substrates 100 and 200. At least one of the first and second alignment layers 410 and 420 may include a copolymer of a dianhydride compound and a diamine compound, and the copolymer may include repeating units represented by Formula 1:

Formula 1

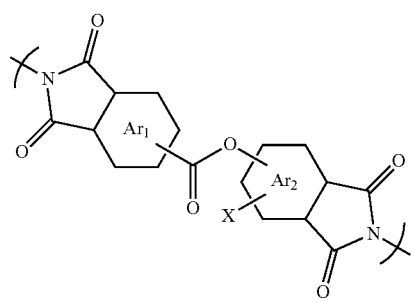

wherein each of $Ar_1$ and $Ar_2$ is independently a substituted or unsubstituted aromatic group including 6 to 30 carbon atoms,

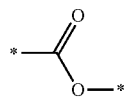

is an ester group, wherein "*" indicates a point of attachment to the aromatic groups $Ar_1$ and $Ar_2$, X is an EDG and may be —$C_nH_{2n+1}$, —$OC_nH_{2n+1}$, —$NH_2$, —$NH(C_nH_{2n+1})$, —$N(C_nH_{2n+1})_2$, —OH, —NH($COC_nH_{2n+1}$), —$N(COC_nH_{2n+1})_2$, —$OCOC_nH_{2n+1}$, —$CH_2$ ($CC_nH_{2n+1}$), —$CH(C_nH_{2n+1})_2$, —$C(C_nH_{2n+1})_3$, —F, —Cl, or —Br, and n may be a natural number from 1 to 10.

Also, the copolymer may include a repeating unit represented by Formula 6:

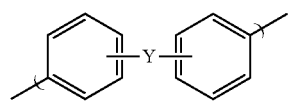

Formula 6 wherein Y is a divalent organic group derived from a diamine compound.

In an embodiment, the Formula 6 may have a structure represented by Formula 6-1:

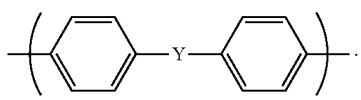

Formula 6-1

The ratio of the repeating units represented by Formula 6 and the repeating units represented by Formula 1 may be 1:1. For example, the copolymer may be represented by Formula 7:

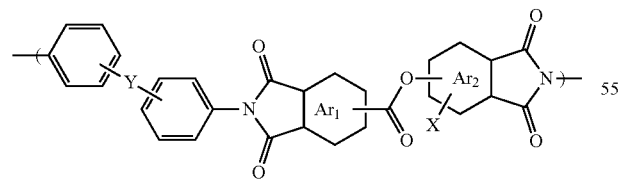

Formula 7 wherein $Ar_1$, $Ar_2$, and X is the same as $Ar_1$, $Ar_2$, and X of Formula 1, and Y is the same as Y of Formula 6.

In an embodiment, the Formula 7 may have a structure represented by Formula 7-1:

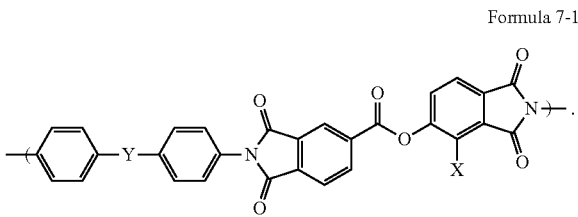

Formula 7-1

The copolymer may further include a repeating unit represented by Formula 8:

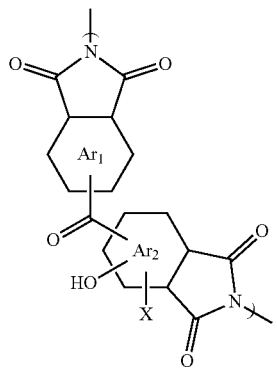

Formula 8 wherein $Ar_1$, $Ar_2$, and X are the same as X of Formula 1.

In an embodiment, the Formula 8 may have a structure represented by Formula 8-1:

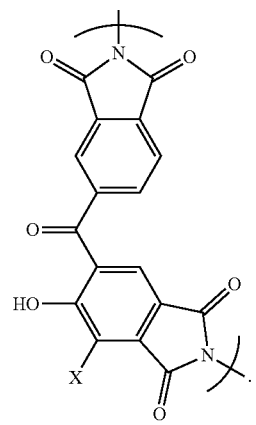

Formula 8-1

The copolymer may include the repeating unit represented by Formula 8 and the repeating unit represented by Formula 6. That is, the copolymer may include a repeating unit represented by Formula 9:

Formula 9

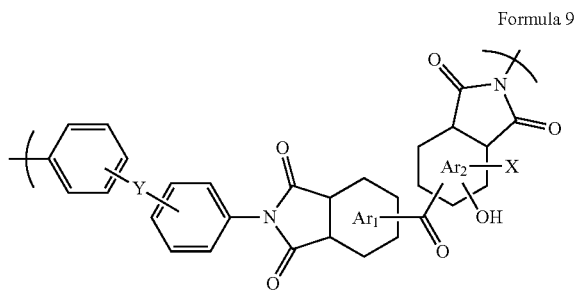

wherein
$Ar_1$, $Ar_2$, and X are the same as X of Formula 1, and Y is the same as Y of Formula 6.

In an embodiment, the Formula 9 may have a structure represented by Formula 9-1:

Formula 9-1

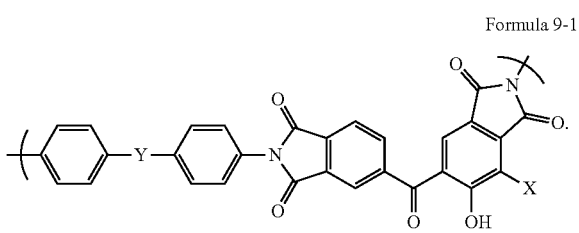

The copolymer contained in the first alignment layer 410 and/or the second alignment layer 420 will hereinafter be described. At least one (or some) of the repeating units represented by Formula 7 may be transformed into repeating units represented by Formula 9 by the step of applying polarized light, as performed in the fabrication of an LCD. In a non-limiting example, the amount of repeating units represented by Formula 9 may be smaller than the amount of repeating units represented by Formula 7, and the percentage of repeating units represented by Formula 7 that are transformed into repeating units represented by Formula 9 may be, for example, about 5 percent (%) to about 30%. This means that in the copolymer contained in the first alignment layer 410 and/or the second alignment layer 420, the repeating units represented by Formula 1 are transformed into the repeating units represented by Formula 8. The transformation of the repeating units represented by Formula 1 into the repeating units represented by Formula 8 has already been described above with regard to the alignment layer composition according to an exemplary embodiment, and thus, a detailed description thereof will be omitted.

In short, the repeating units represented by Formula 1 and the repeating units represented by Formula 8 may be included in the first alignment layer 410 and/or the second alignment layer 420, and the repeating units represented by Formula 7 and the repeating units represented by Formula 9 may also be included in the first alignment layer 410 and/or the second alignment layer 420.

FIGS. 5 through 13 are schematic views illustrating a manufacturing method of an LCD, according to an exemplary embodiment of the present disclosure. A manufacturing method of an LCD, according to an exemplary embodiment of the present disclosure, will hereinafter be described with reference to FIGS. 5 through 13.

Figure 5:
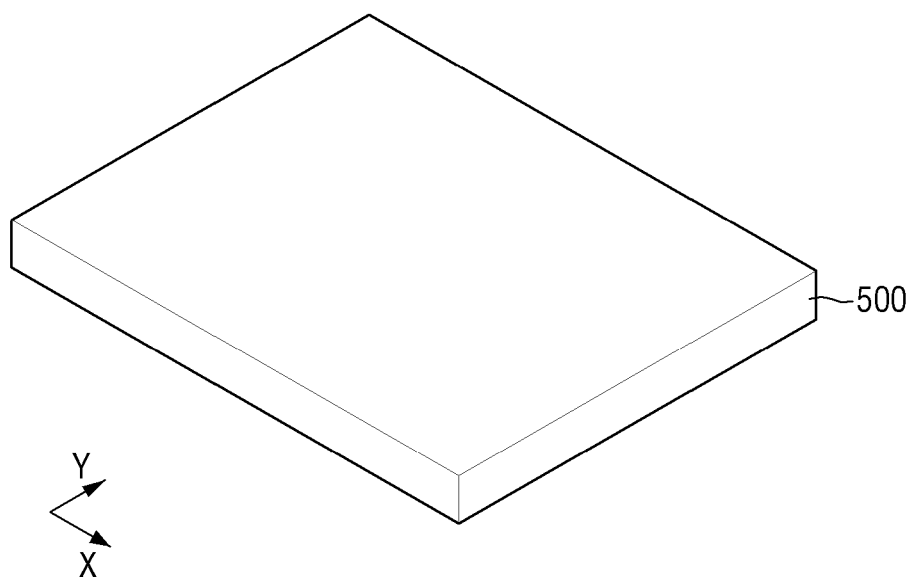
FIGS. 5 through 13 are schematic views illustrating a manufacturing method of an LCD, according to an exemplary embodiment of the present disclosure.

Referring to FIG. 5, the manufacturing method of an LCD, according to the present exemplary embodiment,
includes providing a substrate 500, and the substrate 500 may correspond to the first or second substrate 100 or 200 of the LCD according to the exemplary embodiment of FIGS. 1 through 3. In an exemplary embodiment, the substrate 500 may be a TFT substrate including a first base substrate, a gate wiring layer, a semiconductor layer, a data wiring layer, a common electrode, a pixel electrode, and a plurality of passivation/insulating layers or may be a counter substrate including a second base substrate, a light-shielding member, a color filter, and an overcoat layer. The arrangement, the shapes, and fabricating methods of the elements of the first or second substrate 100 or 200 of the LCD according to the exemplary embodiment of FIGS. 1 through 3 have already been described with reference to FIGS. 1 through 3, and thus, detailed descriptions thereof will be omitted.

Figure 6:
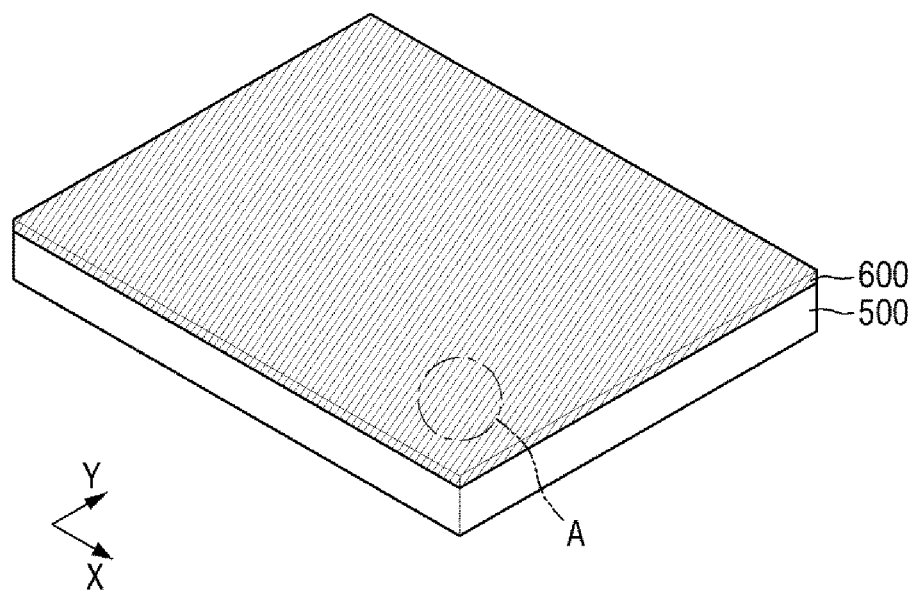
Figure 7:
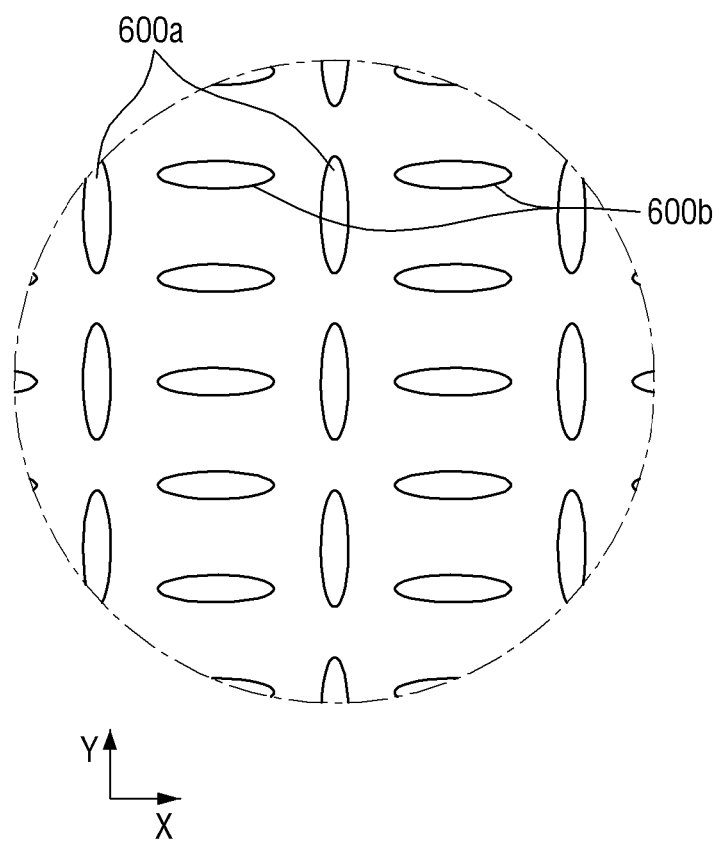

Referring to FIGS. 6 and 7, the manufacturing method of an LCD, according to the present exemplary embodiment, further includes forming a pre-alignment layer 600 by providing an alignment layer composition onto the substrate 500. The pre-alignment layer 600 may be formed by applying the alignment layer composition onto the substrate 500 through, for example, spin coating or slit coating, but the present disclosure is not limited thereto.

The alignment layer composition includes a predetermined solvent and a copolymer of a dianhydride compound and a diamine compound, and the copolymer may include repeating units represented by Formula 1.

Formula 1

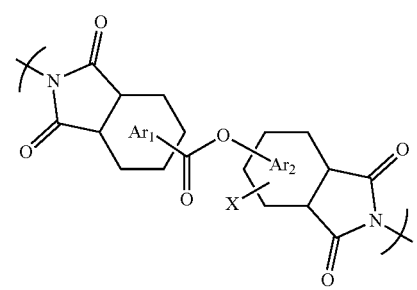

wherein
each of $Ar_1$ and $Ar_2$ is independently a substituted or unsubstituted aromatic group including 6 to 30 carbon atoms,

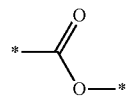 [SMILES: *OC(*)=O]

is an ester group, wherein "*" indicates a point of attachment to the aromatic groups $Ar_1$ and $Ar_2$, X is an electron donating group (EDG), which may be $-C_nH_{2n+1}$, $-OC_nH_{2n+1}$, $-NH_2$, $-NH(C_nH_{2n+1})$, $-N(C_nH_{2n+1})_2$, $-OH$, $-NH(COC_nH_{2n+1})$, $-N(COC_nH_{2n+1})_2$, $-OCOC_nH_{2n+1}$, $-CH_2(C_nH_{2n+1})$, $-CH(C_nH_{2n+1})_2$, $-C(C_nH_{2n+1})_3$, $-F$, $-Cl$, or $-Br$, and n may be a natural number from 1 to 10.

In an embodiment, the Formula 1 may have a structure represented by Formula 1-1:

Formula 1-1

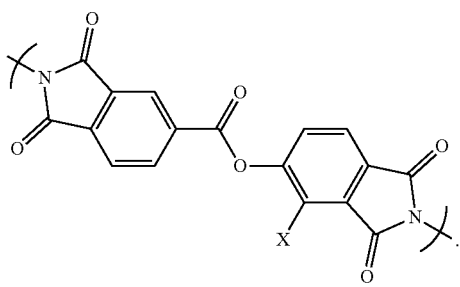

The term "pre-alignment layer", as used herein, may denote a layer including the alignment layer composition and yet to have an aligning property.

Referring to FIG. 7, the copolymer in the pre-alignment layer 600 on the substrate 500 may include first polymer chains 600b, which have an orientation in an arbitrary first direction X, and second polymer chains 600a, which have an orientation in an arbitrary second direction Y that is perpendicular to the first direction X. The first polymer chains 600b, which have a predetermined length, and the second polymer chains 600a, which also have a predetermined length, are arranged repeatedly in the first and second directions X and Y, and may thus be treated substantially as a continuum.

Figure 8:
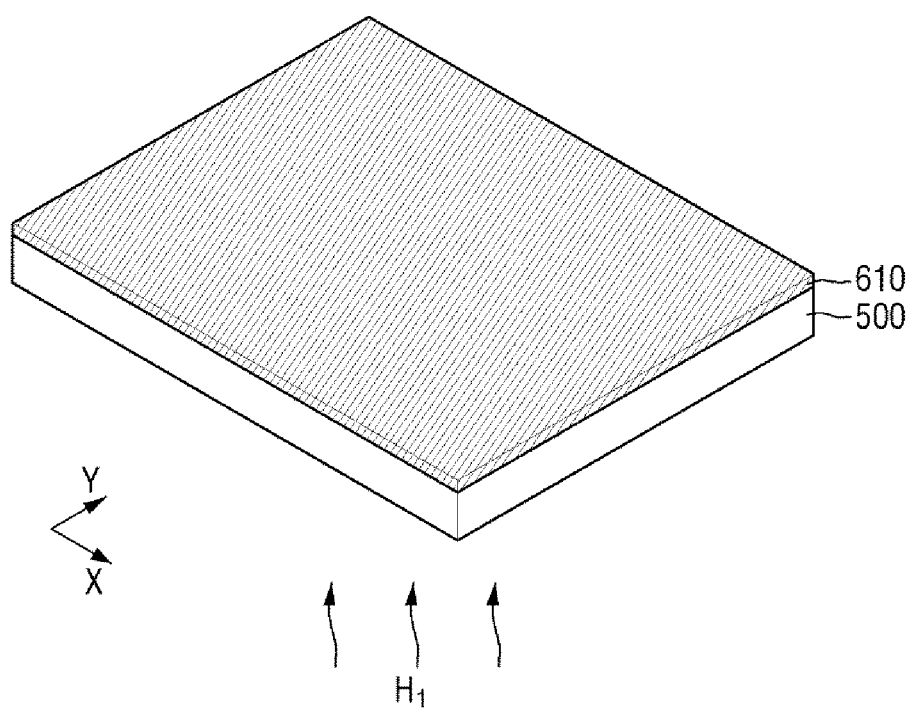

Referring to FIG. 8, in a non-limiting example, the manufacturing method of an LCD, according to the present exemplary embodiment, may further include performing a pretreatment process $H_1$ on the pre-alignment layer 610 at a temperature of 60° C. to 80° C. for 50 to 100 seconds. The step of performing the pretreatment process $H_1$ may be for removing the solvent contained in the alignment layer composition. As a result of the step of performing pretreatment ($H_1$), the fluidity of the pre-alignment layer 610 may be reduced, and the dispersibility of the alignment layer composition scattered in the pre-alignment layer 610 may also be reduced. The step of performing pretreatment ($H_1$) may be for evaporating the solvent contained in the alignment layer composition, but may be optional.

Figure 9:
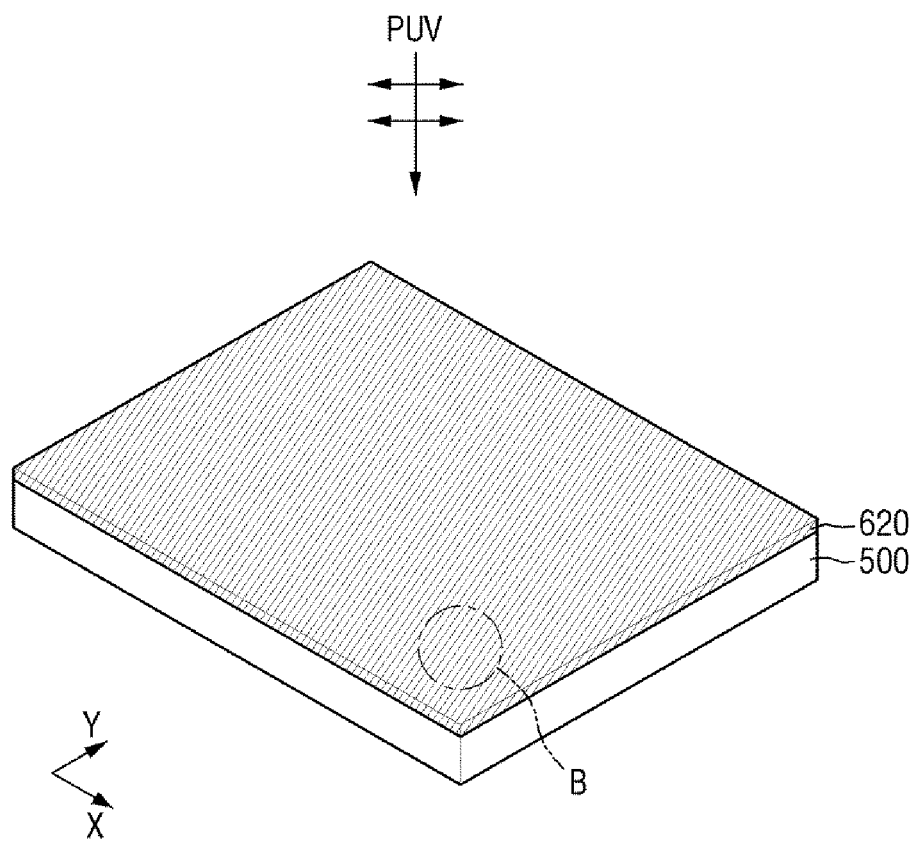
Figure 10:
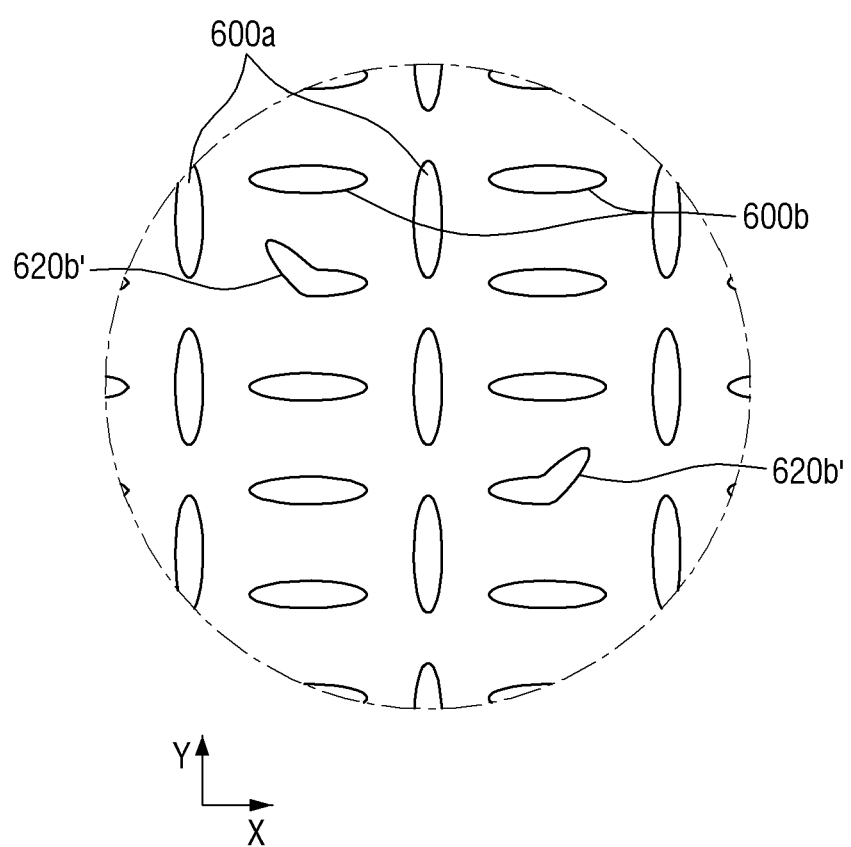

Referring to FIGS. 9 and 10, the manufacturing method of an LCD, according to the present exemplary embodiment, may further include the step of applying linearly polarized light PUV to a pre-alignment layer 620. FIG. 9 illustrates applying light linearly polarized in the first direction X, but the present disclosure is not limited thereto. That is, the polarization direction of the linearly polarized light PUV may vary as necessary.

The step of applying the linearly polarized light PUV to the pre-alignment layer 620 may be for imparting anisotropy to the pre-alignment layer 620. The linearly polarized light PUV may be at least one of ultraviolet (UV) light, infrared (IR) light, far-infrared (FIR) light, electron beams, and radiation. For example, the linearly polarized light PUV may be UV light having a wavelength of about 250 nm to about 330 nm, UV light having a wavelength of about 254 nm, or UV light having a wavelength of about 313 nm.

In response to the linearly polarized light PUV, which is linearly polarized in the first direction X, at least some of the first polymer chains 600b, which have an orientation in the first direction X, may absorb the linearly polarized light PUV, and in at least some of the first polymer chains 600b that absorb the linearly polarized light PUV, the repeating units represented by Formula 1 may be transformed into the repeating units represented by Formula 8. That is, as illustrated in FIG. 10, in at least some of the first polymer chains 600b having an orientation in the first direction X, the repeating units represented by Formula 1 may be transformed into the repeating units represented by Formula 8, and thus, the at least some of the first polymer chains 600b may be transformed into modified polymer chains 620b' that are bent in a particular direction. In other words, the first polymer chains 600b that remain unmodified or the second polymer chains 600a may include the repeating units represented by Formula 1, and the modified polymer chains 620b' may include the repeating units represented by Formula 8.

The unmodified first polymer chains 600b or the second polymer chains 600a may include the repeating units represented by Formula 7, and the modified polymer chains 620b' may include the repeating units represented by Formula 9.

Figure 14:
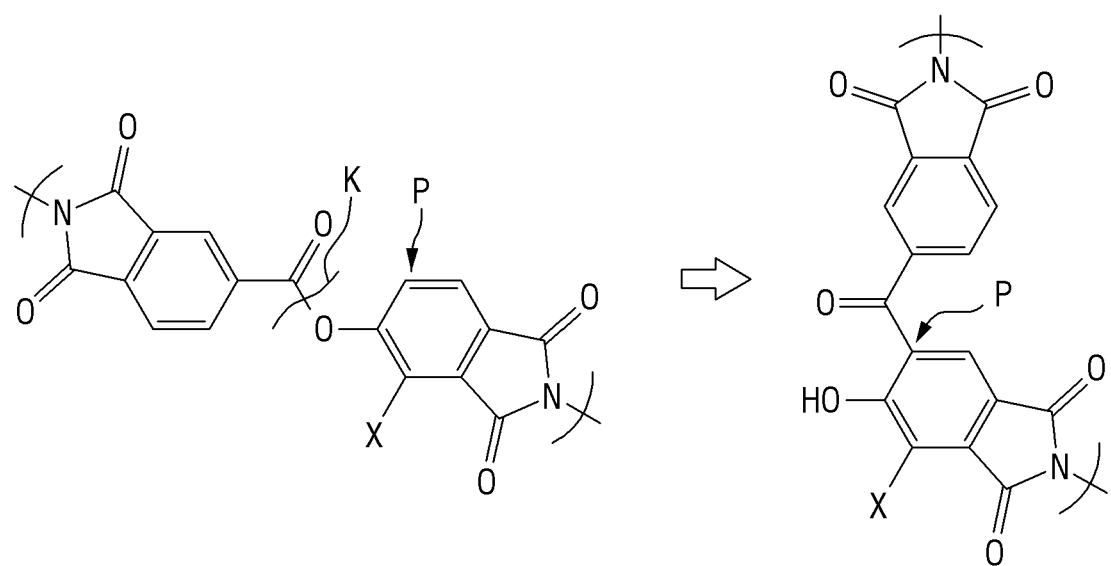
FIG. 14 shows Reaction Equation 1.

Referring to Reaction Equation 1 below and FIG. 14, a "C—O" bond (K) in the O=C—O group in the phenyl ester group of each of the repeating units represented by Formula 1 is cleaved and is recombined to a portion P, and as a result, some of the first polymer chains 600b may be transformed into the modified polymer chains 620b' including the repeating units represented by Formula 8. Accordingly, some of the first polymer chains 600b may be transformed in such a way that their orientation changes from the first direction X to the second direction Y. Similarly, the repeating units represented by Formula 7 may be transformed into the repeating units represented by Formula 9.

For example, in an embodiment, the repeating units represented by Formula 7-1 may be transformed into the repeating units represented by Formula 9-1:

Reaction Equation 1

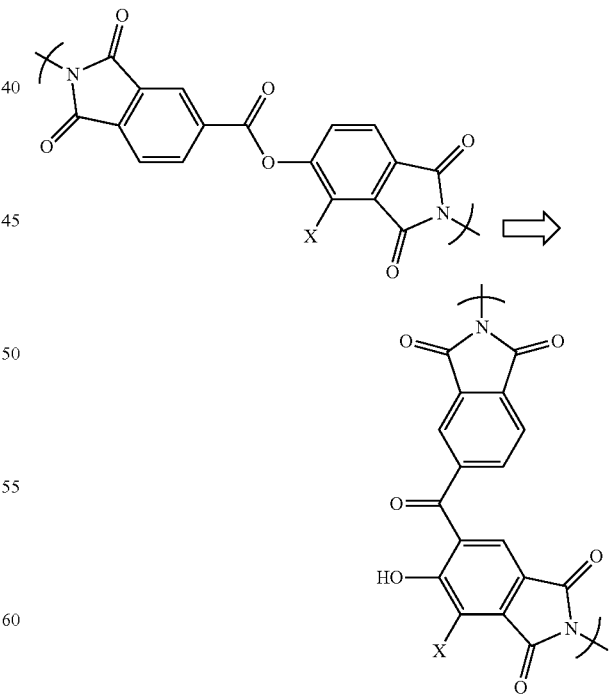

wherein
X is an EDG and may be one of —$C_nH_{2n+1}$, —$OC_nH_{2n+1}$, —$NH_2$, —$NH(C_nH_{2n+1})$, —$N(C_nH_{2n+1})_2$, —OH, —NH ($COC_nH_{2n+1}$), —$N(COC_nH_{2n+1})_2$, —$OCOC_nH_{2n+1}$, —$CH_2$ ($C_nH_{2n+1}$), —$CH(C_nH_{2n+1})_2$, —$C(C_nH_{2n+1})_3$, —F, —Cl, or —Br, and n may be a natural number from 1 to 10.

A method of aligning the pre-alignment layer 620 by absorbing the linearly polarized light PUV will hereinafter be described with reference to FIG. 10. At least some of the first polymer chains 600*b* having a linearity or orientation substantially in the first direction X may be realigned and stabilized by being bent (tilted) in a different direction from the first direction X (i.e., in a direction slightly deviated from the first direction X toward the second direction Y) through a reaction represented by Reaction Equation 1, and may thus be transformed into the modified polymer chains 620*b*'. As a result, the continuity, in the first direction X, of the first polymer chains 600*b* may decrease. On the other hand, no photoreaction is induced in the second polymer chains 600*a* having linearity in the second direction Y, and thus, anisotropy may generally be imparted to the entire pre-alignment layer 620.

In the step of applying the linearly polarized light PUV to the pre-alignment layer 620, the linearly polarized light PUV may be applied at an exposure amount of about 0.1 Joules per square centimeter ($J/cm^2$) to 3.0 $J/cm^2$. The exposure amount may be controlled by the duration of application of the linearly polarized light PUV or the intensity of the linearly polarized light PUV, but may vary depending on the driving mode of an LCD or the physical properties of the main ingredients of a photo-alignment layer to be formed.

The alignment layer composition does not generate any byproducts of a photoreaction such as, for example, a photodecomposition reaction, and thus does not need an additional rinsing process. Accordingly, any damage or pollution that may be caused, during rinsing, to an alignment layer with anisotropy imparted thereto may be prevented in advance, and improved processability may be provided. However, in some exemplary embodiments, a rinsing process may be performed, in which case, a dry rinsing process or a wet rinsing process may be performed.

Figure 11:
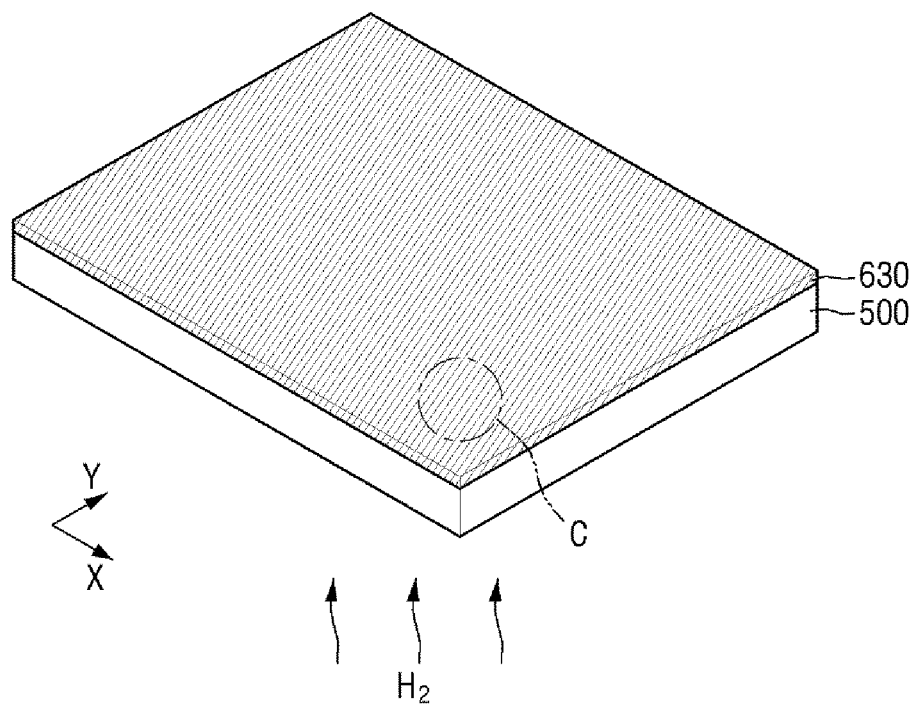
Figure 12:
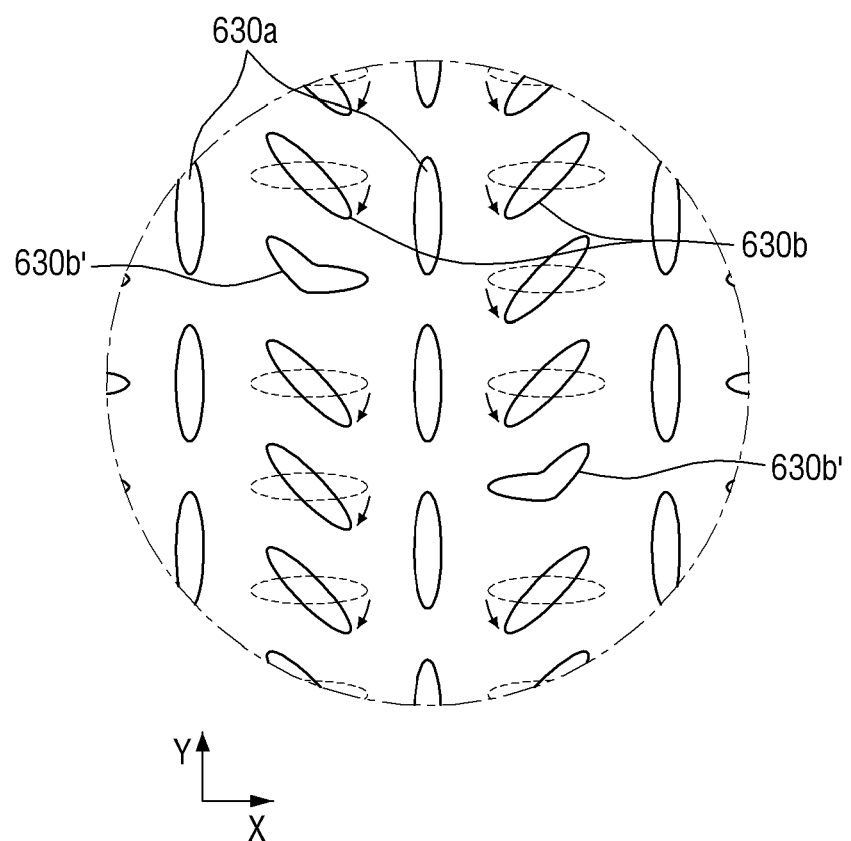

Referring to FIGS. 11 and 12, the manufacturing method of an LCD, according to the present exemplary embodiment, may further include performing a thermal treatment process $H_2$ to a pre-alignment layer 630. The step of performing the thermal treatment process $H_2$ to the pre-alignment layer 630 may be for stabilizing unstable reactive groups after the application of the linearly polarized light PUV and for improving aligning force by realigning first polymer chains 630*b* and/or second polymer chains 630*a*. Also, the step of performing the thermal treatment process $H_2$ to the pre-alignment layer 630 may be for improving the thermal resistance of the pre-alignment layer 630 by removing any remaining solvent.

As discussed above in reference to FIG. 10, modified polymer chains 630*b*', which are obtained by absorbing the linearly polarized light PUV and are partially oriented in the second direction Y, that is perpendicular to the linearly polarized light PUV, are included in the pre-alignment layer 630, and the polymers in the pre-alignment layer 630 may have fluidity at the stage of the thermal treatment process $H_2$. Thus, as illustrated in FIG. 12, the first polymer chains 630*b*, which are disposed in line with the modified polymer chains 630*b*' in the second direction Y and are oriented in the first direction X, may become easily movable because of the fluidity imparted thereto by the thermal treatment process $H_2$, and may be moved in the second direction Y by the second polymer chains 630*a*, which are disposed adjacent to the first polymer chains 630*b*.

Figure 13:
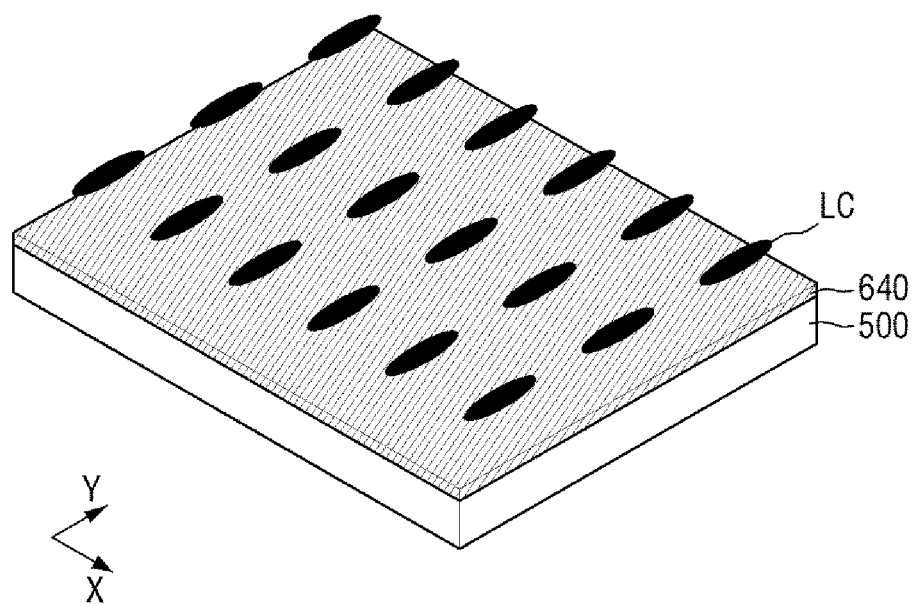

That is, due to the influence of parts of the modified polymer chains 630*b*' that are modified to be aligned in the second direction Y and the second polymer chains 630*a* that are aligned in the second direction Y, polymer chains that are on the sides, in the second direction Y, of the modified polymer chains 630*b*' may gradually flow to the second direction Y and may thus be aligned in the second direction Y. As a result, the pre-alignment layer 630 may be transformed into an alignment layer 640 having an orientation in the second direction Y, as illustrated in FIG. 13.

In other words, as a result of the step of applying the linearly polarized light PUV to the pre-alignment layer 620, the first polymer chains 630*b* may become intermittent in the first direction X, and may thus be easily realigned because of a weak force of interaction therebetween, whereas the second polymer chains 630*a* resist realignment because of a strong force of interaction therebetween.

That is, the first polymer chains 630*b* in which a photoreaction partially takes place are realigned by the thermal treatment process $H_2$, whereas the second polymer chains 630*a* maintain their orientation in the second direction Y without realignment. Thus, the first polymer chains 630*b* and the second polymer chains 630*a* may generally be oriented in the second direction Y, and as a result, further anisotropy may be imparted to the pre-alignment layer 630.

The thermal treatment process $H_2$ may be performed at a temperature of 210° C. to 240° C. for 20 to 45 minutes, but the present disclosure is not limited thereto.

Referring to FIG. 13, a liquid crystal layer including liquid crystal molecules LC may be formed on the substrate 500, and a counter substrate (not illustrated) may be bonded onto the substrate 500. The long axes of the liquid crystal molecules LC may be aligned substantially in the second direction Y due to anisotropy formed by polymer chains in an alignment layer 640. In an exemplary embodiment, the step of forming the liquid crystal layer may be performed by placing (for example, dropping) a liquid crystal composition onto the substrate 500 and/or the counter substrate, and then bonding the substrate 500 and the counter substrate, or may be performed by bonding the substrate 500 and the counter substrate, and then injecting the liquid crystal composition between the substrate 500 and the counter substrate.

Exemplary embodiments of the present disclosure will hereinafter be described in further detail with reference to the following examples and comparative examples.

EXAMPLES

Examples 1 Through 4

LCDs according to each of Examples 1 through 4 were fabricated by forming alignment layers using, as alignment layer compositions, copolymers including the repeating units represented by Formulas 2 through 5, respectively:

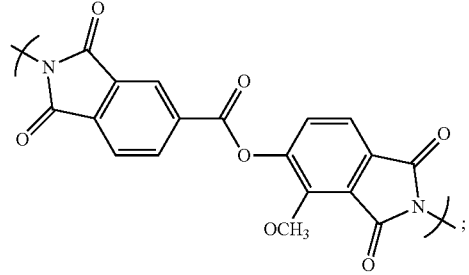

Formula 2

-continued

Formula 3

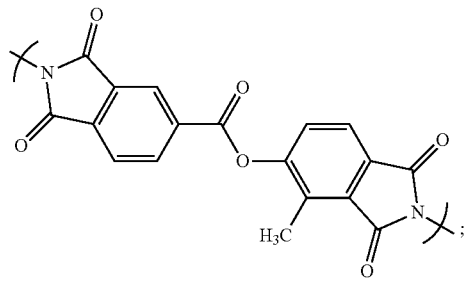

Formula 4

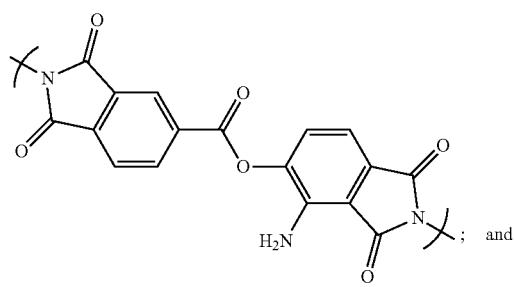
and

Formula 5

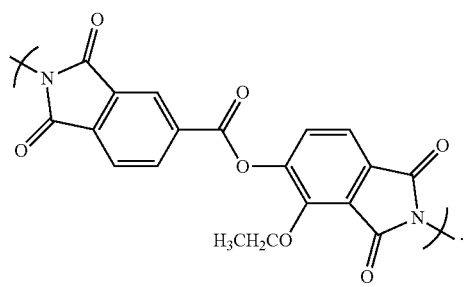

Control Group

An LCD, as a control group, was fabricated by forming an alignment layer using an alignment layer composition having a phenyl ester group, which is a photoreactive group, in its repeating units derived from diamine, as indicated by Formula 10:

Formula 10

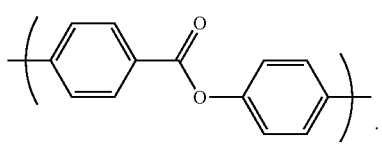

Comparative Example

An LCD according to a comparative example was fabricated by forming an alignment layer using an alignment layer composition having a photoreactive group in its repeating units derived from a dianhydride compound, but having no substituent X attached thereto (unlike the alignment layer composition according to an exemplary embodiment of the present disclosure), as indicated by Formula 11:

Formula 11

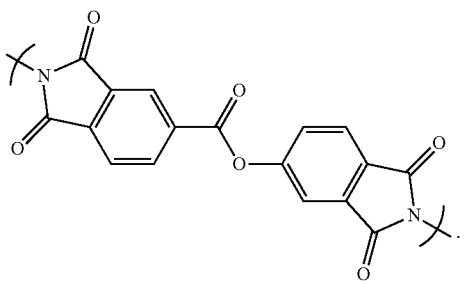

Experimental Example

The BDE of the C—O bond of the O═C—O group in the photoreactive group, the contrast ratio (CR) of, and the black luminance of each of Examples 1 through 4, the control group, and the comparative example were measured, and the results of the measurement are shown in Table 1.

The BDE measurement was performed by simulating and quantifying the C—O bond in each sample under B3LYP/6-31G* conditions through quantum computation using Gaussian's Gaussian 09. The black luminance measurement was performed by measuring the luminance of 2.5-inch plane-to-line switching (PLS)-mode liquid crystal test cells at an initial non-driving state using ELABO's ELABO-203CF. The CR measurement was performed by measuring, using Minolta's CA-210, the difference between the black luminance of 12.9-inch PLS-mode liquid crystal test cells and the luminance of the 12.9-inch PLS-mode liquid crystal test cells when an alternating current of 15 volts (V) was applied.

TABLE 1

|  | BDE (eV) | CR | Black Luminance |
| --- | --- | --- | --- |
| Control Group | 2.851 | 1317 | 0.21 |
| Comparative Example | 3.160 | 975 | 0.3 |
| Example 1 | 2.889 | 1272 | 0.21 |
| Example 2 | 3.019 | 1111 | 0.25 |
| Example 3 | 2.563 | 1674 | 0.12 |
| Example 4 | 2.894 | 1265 | 0.21 |

Referring to Table 1 above, the control group has a phenyl ester group, which is a photoreactive group, included in the repeating units derived from diamine, and thus has an excellent CR and an excellent alignment force with a black luminance of 0.21.

On the other hand, the comparative example has a high BDE and has a CR that is only 80% as high as the CR of the control group, i.e., a poor CR. Also, the comparative example has a black luminance of 0.3, which means a weaker alignment force than the control group.

Examples 1 through 4 have a BDE of 2.563 electron volts (eV) to 3.019 eV and have a CR equivalent to, or higher than, the control group, which means Examples 1 through 4 generally have an excellent CR. Also, Examples 1 through 4 generally have a black luminance equivalent to, or higher than, the control group, which means Examples 1 through 4 have an improved alignment force.

Although the embodiments have been disclosed for illustrative purposes only, those skilled in the art will appreciate that various modifications, additions and substitutions are possible, without departing from the scope and spirit of the inventive concept as disclosed in the accompanying claims.

What is claimed is:

1. A manufacturing method of an LCD, comprising:

providing a substrate;

disposing an alignment layer composition onto the substrate;

applying linearly polarized light to the alignment layer composition; and performing thermal treatment of the alignment layer composition, wherein the alignment layer composition comprises a copolymer of a dianhydride compound and a diamine compound, and wherein the copolymer comprises repeating units represented by Formula 1:

Formula 1

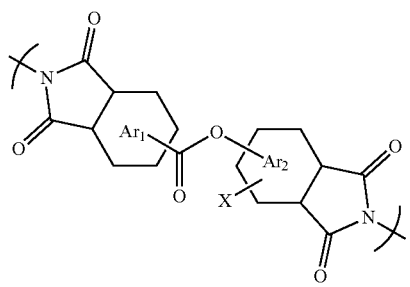

wherein each of $Ar_1$ and $Ar_2$ is independently a substituted or unsubstituted aromatic group comprising 6 to 30 carbon atoms, X is $-C_nH_{2n+1}$, $-OC_nH_{2n+1}$, $-NH_2$, $-NH(C_nH_{2n+1})$, $-N(C_nH_{2n+1})_2$, $-OH$, $-NH(COC_nH_{2n+1})$, $-N(COC_nH_{2n+1})_2$, $-OCOC_nH_{2n+1}$, $-CH_2(C_nH_{2n+1})$, $-CH(C_nH_{2n+1})_2$, $-C(C_nH_{2n+1})_3$, $-F$, $-Cl$, or $-Br$; and n is a natural number from 1 to 10, and $$*-\overset{O}{\underset{O-*}{C}}$$

is an ester group, wherein "*" indicates a point of attachment to the aromatic groups $Ar_1$ and $Ar_2$.

2. The manufacturing method of claim 1, wherein each of $Ar_1$ and $Ar_2$ is independently a substituted or unsubstituted aromatic group comprising 6 carbon atoms.

3. The manufacturing method of claim 2, wherein the Formula 1 has a structure represented by Formula 1-1:

Formula 1-1

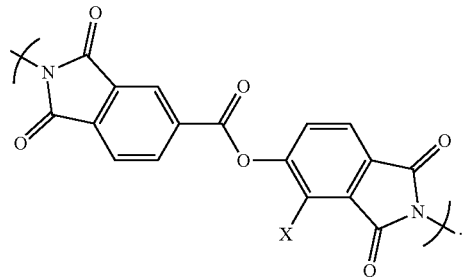

4. The manufacturing method of claim 3, wherein a C—O bond dissociation energy in the ester group of the repeating unit represented by the Formula 1-1 ranges from 2.563 electron volts to 3.019 electron volts.

5. The manufacturing method of claim 3, wherein the Formula 1-1 has a structure represented by one of Formulas 2 through 5:

Formula 2

Formula 3

Formula 4

Formula 5

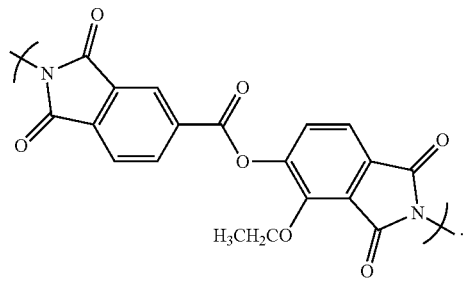

6. The manufacturing method of claim 1, wherein the copolymer further comprises a repeating unit represented by Formula 6:

Formula 6

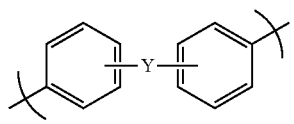

wherein Y is a divalent organic group derived from a diamine compound.

7. The manufacturing method of claim 6, wherein the copolymer comprises a repeating unit represented by Formula 7:

Formula 7

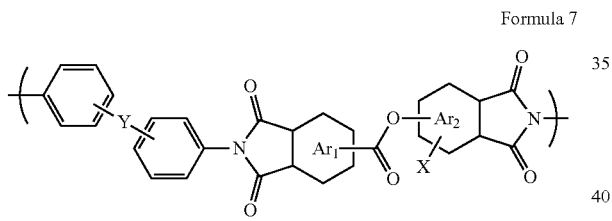

wherein
each of $Ar_1$ and $Ar_2$ is independently a substituted or unsubstituted aromatic group comprising 6 to 30 carbon atoms.

8. The manufacturing method of claim 7, wherein the Formula 7 has a structure represented by Formula 7-1:

Formula 8

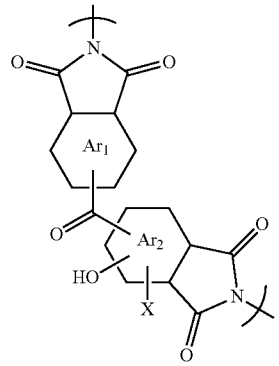

wherein
each of $Ar_1$ and $Ar_2$ is independently a substituted or unsubstituted aromatic group comprising 6 to 30 carbon atoms.

10. The manufacturing method of claim 9, wherein the Formula 8 has a structure represented by Formula 8-1:

Formula 8-1

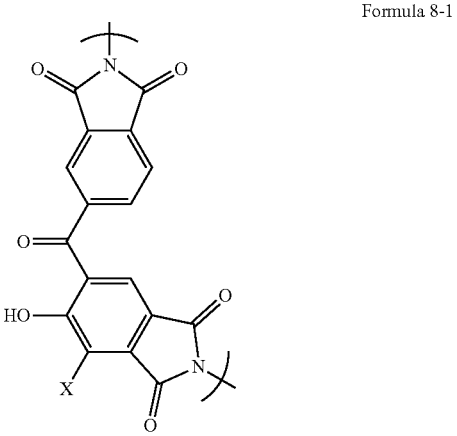

11. The manufacturing method of claim 1, wherein the mole ratio of the dianhydride compound and the diamine compound is about 1:1.

Formula 7-1

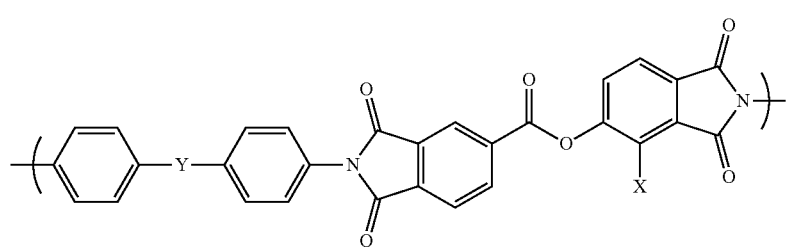

9. The manufacturing method of claim 1, wherein the applying the linearly polarized light transforms at least one repeating unit represented by Formula 1 into a repeating unit represented by Formula 8:

12. The manufacturing method of claim 9, wherein the at least one repeating unit represented by Formula 1 in a polarization direction of the linearly polarized light is transformed into the repeating unit represented by Formula 8.

13. The manufacturing method of claim 7, wherein the applying the linearly polarized light transforms at least one repeating unit represented by Formula 7 into a repeating unit represented by Formula 9:

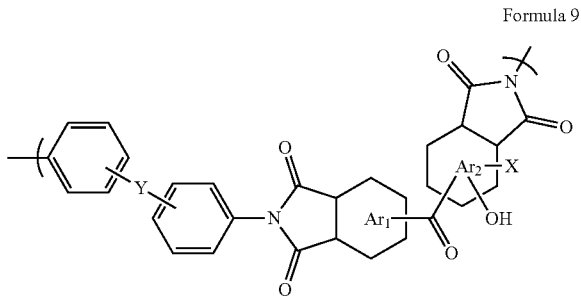

Formula 9 wherein each of $Ar_1$ and $Ar_2$ is independently a substituted or unsubstituted aromatic group comprising 6 to 30 carbon atoms.

14. The manufacturing method of claim 13, wherein the at least one repeating unit represented by Formula 7 in a polarization direction of the linearly polarized light is transformed into the repeating unit represented by Formula 9.

15. The manufacturing method of claim 1, wherein the performing thermal treatment is carried out at a temperature of about 210° C. to 240° C. for about 20 to 45 minutes.

16. The manufacturing method of claim 1, further comprising, before the applying the linearly polarized light:

performing pretreatment on the alignment layer composition at a temperature of about 60° C. to 80° C. for about 50 to 100 seconds.

* * * * *